S. OAKMAN.

Improvement in Formers for Segmentally Screw-Threaded Insulators.

No. 132,215. Patented Oct. 15, 1872.

WITNESSES

INVENTOR

UNITED STATES PATENT OFFICE.

SAMUEL OAKMAN, OF BOSTON, MASSACHUSETTS.

IMPROVEMENT IN FORMERS FOR SEGMENTALLY SCREW-THREADED INSULATORS.

Specification forming part of Letters Patent No. 132,215, dated October 15, 1872.

CASE B.

*To all whom it may concern:*

Be it known that I, SAMUEL OAKMAN, of Boston, in the county of Suffolk and State of Massachusetts, have invented a certain new and useful Mold for Telegraphic Insulators, of which the following is a specification:

The Nature of the Invention.

The nature of my invention consists in constructing a device for forming a screw-thread on the inside of glass insulators. Said device, called a "point," is made of an outside tube, the tube being slotted, and provided with screw-thread-bearing segments which fit into slots, and may be withdrawn radially and thus free themselves from the molded glass, the segments being dovetailed to a coned spindle which fills the interior of the tube.

General Description.

Figure 1:
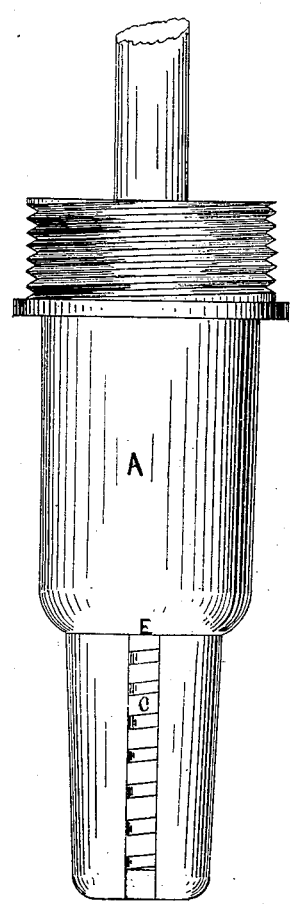
Figure 1 is an elevation of the invention.
Figure 3:
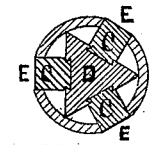
Fig. 3 is a cross-section through the lower part of the same.

Let A represent the outer tube or point, which forms the interior of the insulator. This tube has slots E, Figs. 1 and 3, in which the segment thread-bearing pieces C C C rest. These pieces C C C are dovetailed to the center piece D, which is made conical and so as to slide up and down in the tube A. As the pieces C C C have no longitudinal motion it is evident that an upward motion of the center piece D will cause the pieces C C C to be drawn inwardly, as indicated by the dotted lines.

Figure 2:
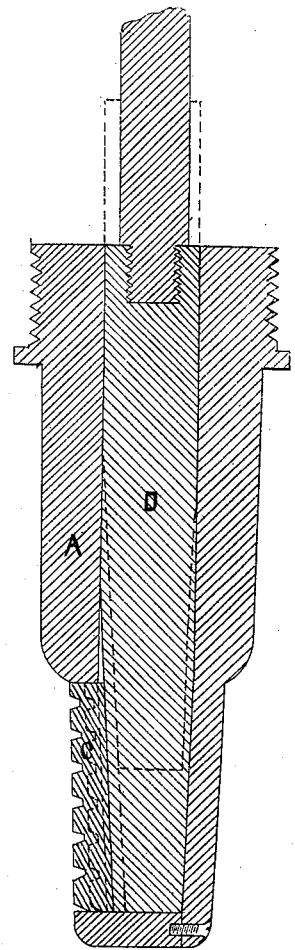
Fig. 2 shows the same in vertical section.

To form the screw in the insulator the "point" is inserted with the spindle D clear down, as shown in full lines in Fig. 2. When the glass has set the spindle D is drawn up, which causes the pieces C C C to draw inwardly and thus free themselves from the inwardly-projecting thread on the inside of the insulator.

I claim as my invention—

The combination of the tube A, the spindle D, and the segment-pieces C C C, operating substantially as described, and for the purpose set forth.

SAMUEL OAKMAN.

Witnesses:
A. HUN BERRY,
FRANK G. PARKER.